US007753681B2

(12) United States Patent
Smith et al.

(10) Patent No.: US 7,753,681 B2
(45) Date of Patent: Jul. 13, 2010

(54) NUTRIENT CONSUMPTION/EXPENDITURE PLANNING AND TRACKING APPARATUS SYSTEM AND METHOD

(76) Inventors: Judith Smith, 39565 Patterson La., Solon, OH (US) 44139; Scott Drew Smith, 39565 Patterson La., Solon, OH (US) 44139

( * ) Notice: Subject to any disclaimer, the term of this patent is extended or adjusted under 35 U.S.C. 154(b) by 760 days.

(21) Appl. No.: 11/550,480

(22) Filed: Oct. 18, 2006

(65) Prior Publication Data

US 2007/0089335 A1 Apr. 26, 2007

Related U.S. Application Data

(60) Provisional application No. 60/729,334, filed on Oct. 21, 2005.

(51) Int. Cl.
*G09B 19/00* (2006.01)

(52) U.S. Cl. .................................................... 434/127

(58) Field of Classification Search ................ 434/127, 434/236, 247; 283/115
See application file for complete search history.

(56) References Cited

U.S. PATENT DOCUMENTS 2,314,387 A * 3/1943 Carlsson .................... 434/127
2,592,106 A * 4/1952 Askeli ........................ 434/404
3,769,720 A 11/1973 Terrones
4,310,316 A * 1/1982 Thomann .................... 434/127
4,650,218 A * 3/1987 Hawke ........................ 283/67
4,652,241 A * 3/1987 McCarty ..................... 434/127
4,832,603 A * 5/1989 Basil .......................... 434/127
4,976,622 A * 12/1990 Clark .......................... 434/127
4,979,901 A 12/1990 Robertson et al.
5,044,958 A 9/1991 Robertson et al.
5,178,416 A * 1/1993 Wennik ..................... 283/52.1
5,338,202 A * 8/1994 Saari .......................... 434/127
5,382,165 A * 1/1995 Knox ......................... 434/127
5,640,774 A * 6/1997 Goldman ................... 33/1 SD
5,683,251 A * 11/1997 Logan et al. ................ 434/127
5,839,901 A 11/1998 Karkanen
6,095,949 A 8/2000 Arai
6,431,873 B1 * 8/2002 Flagg ......................... 434/127
6,553,386 B1 4/2003 Alabaster
6,585,516 B1 7/2003 Alabaster

* cited by examiner

*Primary Examiner*—Kurt Fernstrom
(74) *Attorney, Agent, or Firm*—Schmeiser, Olsen & Watts, LLP

(57) ABSTRACT

An apparatus, system and method is provided facilitating the planning and tracking of nutrient consumption and expenditure by humans, especially children, including various indicators such as graphical images pertaining to potential dietary intake of foods and liquids like vegetables, fruits and water and physical activities like running, dancing and the like, wherein the various indicators are uniquely charted to accomplish the monitoring and/or projecting of nutrient utilization.

7 Claims, 7 Drawing Sheets

NUTRIENT CONSUMPTION/EXPENDITURE PLANNING AND TRACKING APPARATUS SYSTEM AND METHOD

CROSS REFERENCE TO RELATED APPLICATIONS

This application claims benefit to U.S. Provisional No. 60/729,334 filed Oct. 21, 2005, the contents of which are incorporated in its entirety.

BACKGROUND OF THE INVENTION

1. Technical Field

The present invention relates generally to the field of dietary management. More specifically, it relates to a charting apparatus, system and method for planning and tracking nutrient consumption and expenditure 2. Related Art Dietary management is a concern for many people. As such, many devices, systems and methods have been contrived to help people track and/or plan nutrient consumption. Moreover, the dietary management of children is of concern to may people especially parents. The various nutrients that may possibly be consumed by people affect dietary activity and are expended in different ways affecting overall health in various manners. For example, fruits and vegetables are excellent sources of complex carbohydrates, dietary fiber, and numerous vitamins and minerals; all of which are nutrients that may benefit the human body. Moreover, diets that are rich in fruits and vegetables are associated with a decreased risk of cancer of the colon, breast, lung, oral cavity, larynx, esophagus, stomach, bladder, cervix, and pancreas. Children who develop the habit of eating lots of fruits and vegetables are more apt to continue this health habit into adulthood. However, fruit and vegetable intake among many children is low. The U.S. Department of Agriculture has increased the recommended daily intake of fruits and vegetables in the 2005 Dietary Guidelines from Americans, and children are now advised to eat from 4 to 8 one-half cup servings of fruits and vegetables daily, depending on their age and gender.

In addition, liquid nutritional intake is also a critical factor in the dietary activity of people. Water is an essential liquid that must be consumed in order to maintain proper health. Unfortunately, soft drinks and sugar-sweetened fruit drinks have largely replaced more nutritious liquids such as water and low-fat milk in many children's diets. The consumption of calorie-dense, nutrient-absent soft drinks may be linked with rising rates of obesity in American children and teenagers. Additionally, decreases in calcium intake of children may also be attributable to the displacement of milk consumption by soft drinks. For proper health, it is recommended that children drink 2 to 3 cups daily of low-fat milk. More importantly, it is strongly recommended that children age's two to twelve years should have 4 to 8 cups of water per day.

In correlation with nutrient consumption, the bodily expenditure of nutrients is also of concern to many people. As such, many devices, systems and methods have been contrived to help people track and/or plan nutrient expenditure. For example, exercise machines and/or activity regimens have been developed to provide physical activities yielding some predictability in nutrient expenditure. Physical activity may be protective against weight problems in children and youth. Parents and others may be desirous to monitor and/or promote physical activity in children to assist in the maintenance of the health and well-being of the children. Hence a need exists for an apparatus system and method facilitating the planning and tracking of nutrient consumption and expenditure by humans, especially children.

SUMMARY OF THE INVENTION

A first general aspect of the invention includes a nutrient consumption/expenditure tracking apparatus comprising a display, wherein the display is partitioned into at least a first distinct categorical region and a second distinct categorical region, a first visual marker, wherein the first visual marker corresponds with the first distinct categorical region and is removably positioned on the display in the first distinct categorical region, a second visual marker, wherein the second visual marker corresponds with the second distinct categorical region and is removably positioned on the display in the second distinct categorical region, wherein the first categorical region includes a label indicating consumable human nutrients and the first visual marker depicts a nutrient consumed by humans, and further wherein the second categorical region includes a label indicating human physical activity and the second visual marker depicts a physical activity performed by humans.

A second general aspect of the invention includes a nutrient consumption/expenditure tracking system comprising a first bank of graphical images categorically depicting human physical activities, a second bank of graphical images categorically depicting consumable human nutrients, wherein each of the graphical images included in the second bank are drawn from the group of consumable human nutrients consisting essentially of fruits, vegetables and water, and a display having designated categorical divisions, wherein graphical images extracted from the first and second bank are removably located in the designated categorical divisions of the display as dictated by governing protocol relative to actual or projected human nutrient consumption and expenditure.

A third general aspect of the invention includes a nutrient consumption/expenditure tracking method comprising providing a chart, wherein the chart includes distinct regions corresponding to categories of human nutrients and human physical activity, and a plurality of visual markers indicative of the categories of human nutrients and human physical activity removably attachable to the chart, wherein at least a first visual marker of the plurality of visual markers depicts a human nutrient and a second visual marker of the plurality of visual markers depicts a human physical activity; removably attaching the first visual marker to the distinct region of the chart corresponding to human nutrients when a person actually consumes the human nutrient representatively depicted in the first visual marker; removably attaching the second visual marker to the distinct region of the chart corresponding to human physical when a person actually performs the human physical activity representatively depicted in the second visual marker; monitoring the placement of visual markers in distinct regions of the chart to determine what types and what amounts of human nutrients were consumed by a person during a period of time in which actual nutrient consumption is tracked via representative visual markers; and monitoring the placement of visual markers in distinct regions of the chart to determine what types and what amounts of human physical activity were performed by a person during a period of time in which actual physical activity is tracked via representative visual markers.

A fourth general aspect of the invention a method of planning nutrient consumption and expenditure comprising providing a first bank of graphical images categorically depicting human physical activities and a second bank of graphical images categorically depicting consumable human nutrients; posting a graphical image from the first bank in a readily observable manner, wherein the posting of the graphical image from the first bank corresponds to projected completion of physical activity to be performed by a person during a set period of time; posting a graphical image from the second bank in a readily observable manner, wherein the posting of the graphical image from the second bank corresponds to projected consumption of a human nutrient by a person during the set period of time; and, utilizing the graphical images posted from the first bank and second bank to dictate the performance of human physical activity and the consumption of human nutrients by a person during the set period of time.

BRIEF DESCRIPTION OF THE DRAWINGS

The features of the present invention will best be understood from a detailed description of the invention and embodiments thereof selected for the purpose of illustration and shown in the accompanying drawings in which.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. Although the drawings are intended to illustrate the present invention, the drawings are not necessarily drawn to scale.

As a preface to the detailed description, it should be noted that, as used in this specification and the appended claims, the singular forms "a", "an" and "the" include plural referents, unless the context clearly dictates otherwise.

A charting apparatus, system and method for planning and tracking nutrient consumption and expenditure is provided, which may incorporate graphical images to track and promote the consumption of nutrients comprising various foods and liquids. Furthermore, the inventive charting apparatus, system and method may comprise graphical images, which when charted also facilitate planning and tracking of nutrient expenditure. Moreover, the apparatus, system and method may include structural components, system elements and methodology comprising optional behavior modification programs corresponding to goals generated based at least in part on charted nutrient consumption and expenditure. Additionally, the tracking and planning, apparatus, system and method may be particularly effective in facilitating nutritional caloric intake and depletion relative to children as the apparatus, system and method can be readily implemented, used and efficiently managed by parents.

Figure 1:
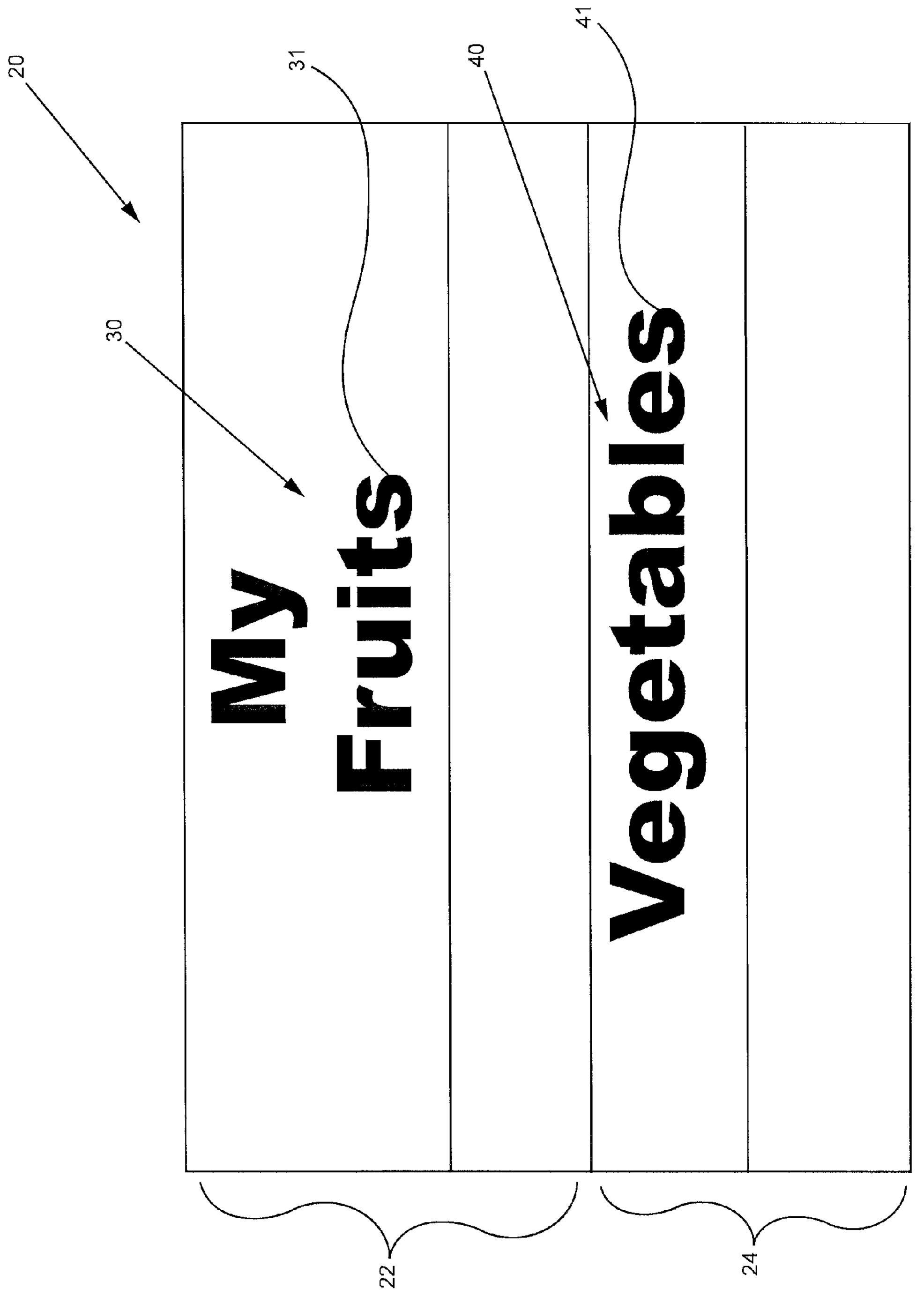
FIG. 1 depicts a front view of an embodiment of a display partitioned into two distinct categories, wherein the categories pertain to "Fruits" and "Vegetables"

Referring to FIG. 1 an embodiment of a display 20 is depicted. The display 20 may be a chart, which may be partitioned into two distinct categories 30 and 40. The partitioning of the display chart 20 may be such that a top physical region 22 of the chart 20 may operate to accommodate category 30. Category 30 may pertain to consumable human nutrients. Accordingly, category 30 may encompass a family of edible "Fruits." For example, the category 30 may be generally representative of soft fruits such as raspberries, blackberries, blueberries, strawberries and the like; citrus fruits such as oranges, lemons, limes, grapefruits, kumquats, tangerines, tangelos and the like; stone fruits such as plums, peaches, apricots, nectarines, cherries, lychees, mangos and the like; fleshy fruits such as apples, pineapples, bananas, papayas, pears, kiwi fruits and the like; vine fruits such as grapes, water melons, cantaloupes, honeydew melons and the like; and/or any similar fruits and the like. Moreover, the partitioning of the display chart 20 may be such that the bottom physical region 24 of the chart 20 may operate to accommodate category 40. Category 40 may pertain to consumable human nutrients. Accordingly, category 40 may encompass a family of edible "Vegetables." For example, the category 40 may be generally representative of alfalfa, artichoke, asparagus, bean sprouts, beans, beets, beetroot, broccoli, brussel sprouts, buk choy, cabbage, capers, capsicum, carrots, cauliflower, celeriac, celery, choko, choy sum, corn cobs, cucumber, eggplant, galangal, garlic, gherkins, green beans, green peppers, kale, kiwano, leeks, legumes, lentils, lettuce, loh bok, mushrooms, okra olives, onions parsnip, peas, peppers, potatoes, pumpkin, radish, red peppers, rhubarb, shallots, snap peas, snow peas, soy, spinach, spring onions, squash, sunflower sprouts, sweet corn, sweet potato, tomato, turnip, watercress, zucchini and/or any similar vegetables and the like.

Referring further to FIG. 1, the display chart 20 may include labels 31 and 41. Label 31 may correspond with the top physical region 22 of the chart 20 and may visually indicate category 30. As such, label 31 may comprise communicative reference to "Fruits". Label 41 may correspond with the bottom physical region 24 of the chart 20 and may visually indicate category 40. As such, label 41 may comprise communicative reference to "Vegetables". It should be understood that the communicative reference of labels 31 and 41 may be accomplished through depicted wording (in any language), through Braille, specific light flash patterns, pixilated representations and/or via pictures, digital icons, drawings and the like.

Figure 2:
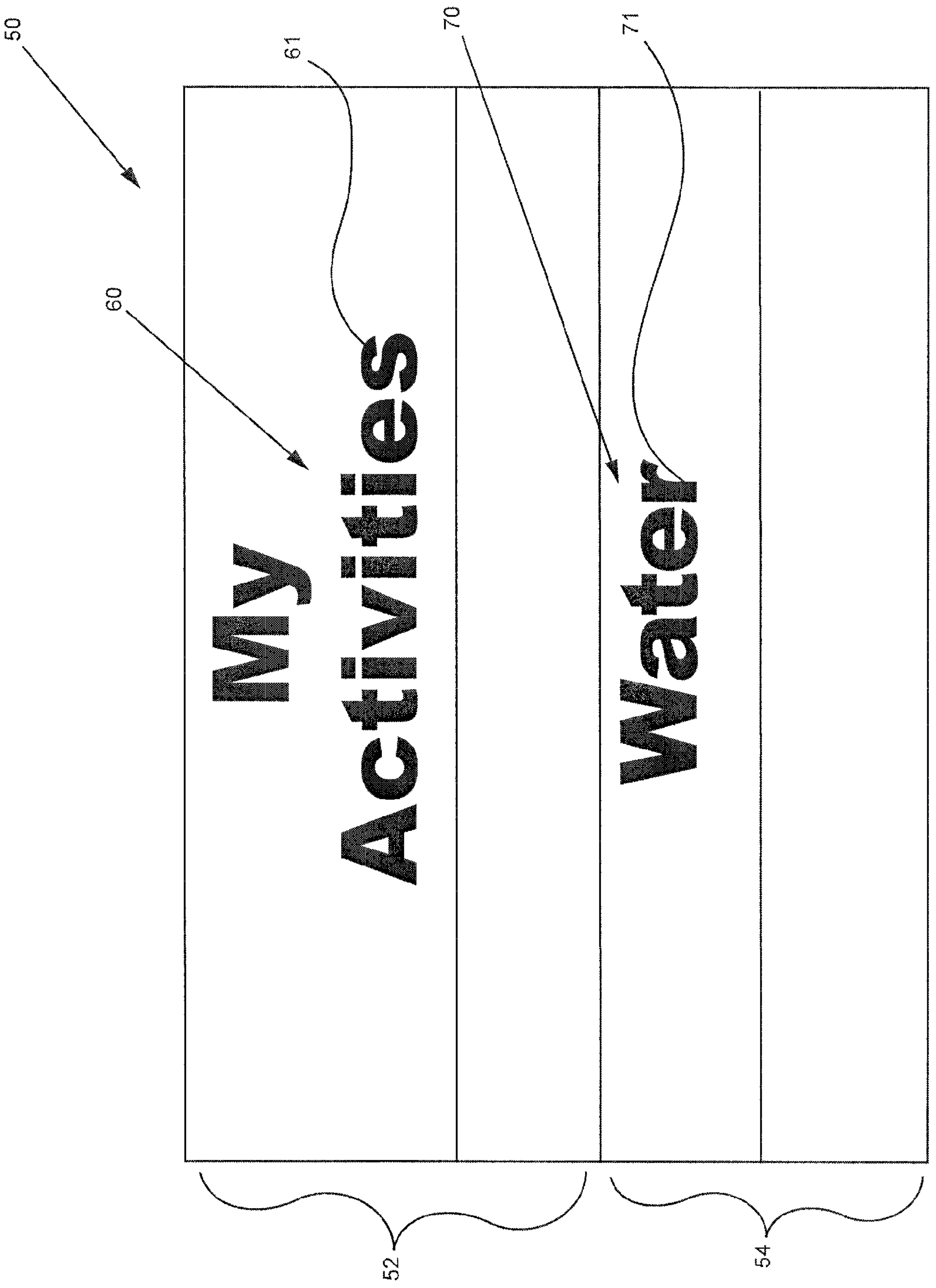
FIG. 2 depicts a front view of an embodiment of a nutrient consumption/expenditure planning and tracking apparatus including an embodiment of a display partitioned into two distinct categories, wherein the categories pertain to "Activities" and "Water"

With continued reference to the drawings, FIG. 2 depicts an embodiment of a nutrient consumption/expenditure planning and tracking apparatus 10 including an embodiment of a display 50. The display 50 may be a chart and may be partitioned into two distinct categories 60 and 70. The partitioning of the display chart 50 may be such that a top physical region 52 of the chart 50 may operate to accommodate category 60. Category 60 may pertain to human physical activities. Hence, the category 60 may be generally representative of actions that may be engaged in by a human body. For example, a human body may perform activities such as baseball, basketball, biking, dancing, exercising, football, gymnastics, hockey, hula-hooping, jump roping, martial arts, playing ball, playing on a play ground, rock climbing, running, skateboarding, skating, skiing, sledding, soccer, swimming, tennis, volleyball, walking, and similar activities and the like. Moreover, the partitioning of the display chart 50 may be such that the bottom physical region 54 of the chart 50 may operate to accommodate category 70. Category 70 may pertain to consumable human nutrients. Accordingly, category 70 may encompass a family of consumable liquids. For example, the category 70, may be generally representative of water, low-fat milk, and/or liquefied substantially pure vegetable and/or substantially pure fruit juices.

Referring further to FIG. 2, the display chart 50 may include labels 61 and 71. Label 61 may correspond with the top physical region 52 of the chart 50 and may visually indicate category 60. As such, label 61 may comprise communicative reference to "Activities". Label 71 may correspond with the bottom physical region 54 of the chart 50 and may visually indicate category 70. As such, label 71 may comprise communicative reference to "Water". Those in the art should recognize that the communicative reference of labels 61 and 71 may be accomplished through depicted wording (in any language), through Braille, specific light flash patterns, pixilated representations and/or via pictures, icons, drawings and the like.

With reference to FIGS. 1-2, an embodiment nutrient consumption/expenditure planning/tracking apparatus, such as apparatus 10, may include a display, such as display 20 and/or display 50. The display 20/50 may be a paper chart, a chalkboard, a whiteboard, a refrigerator panel, a television monitor, a computer monitor, an LCD screen operable with one or multiple electronic devices, a projected image, a flannel board, a magnetic chart board, a laminated sheet of paper, a cloth sheet, and/or other like displays and the like. Moreover, embodiments of a nutrient consumption/expenditure planning/tracking apparatus, such as apparatus 10, may include multiple displays. For example, the apparatus 10 may operatively comprise both a display 20 and a display 50, where in each display may have separately distinctly partitioned and categorically labeled regions. Hence, the combination of displays 20 and 50 may comprise four separate regions.

Figure 3:
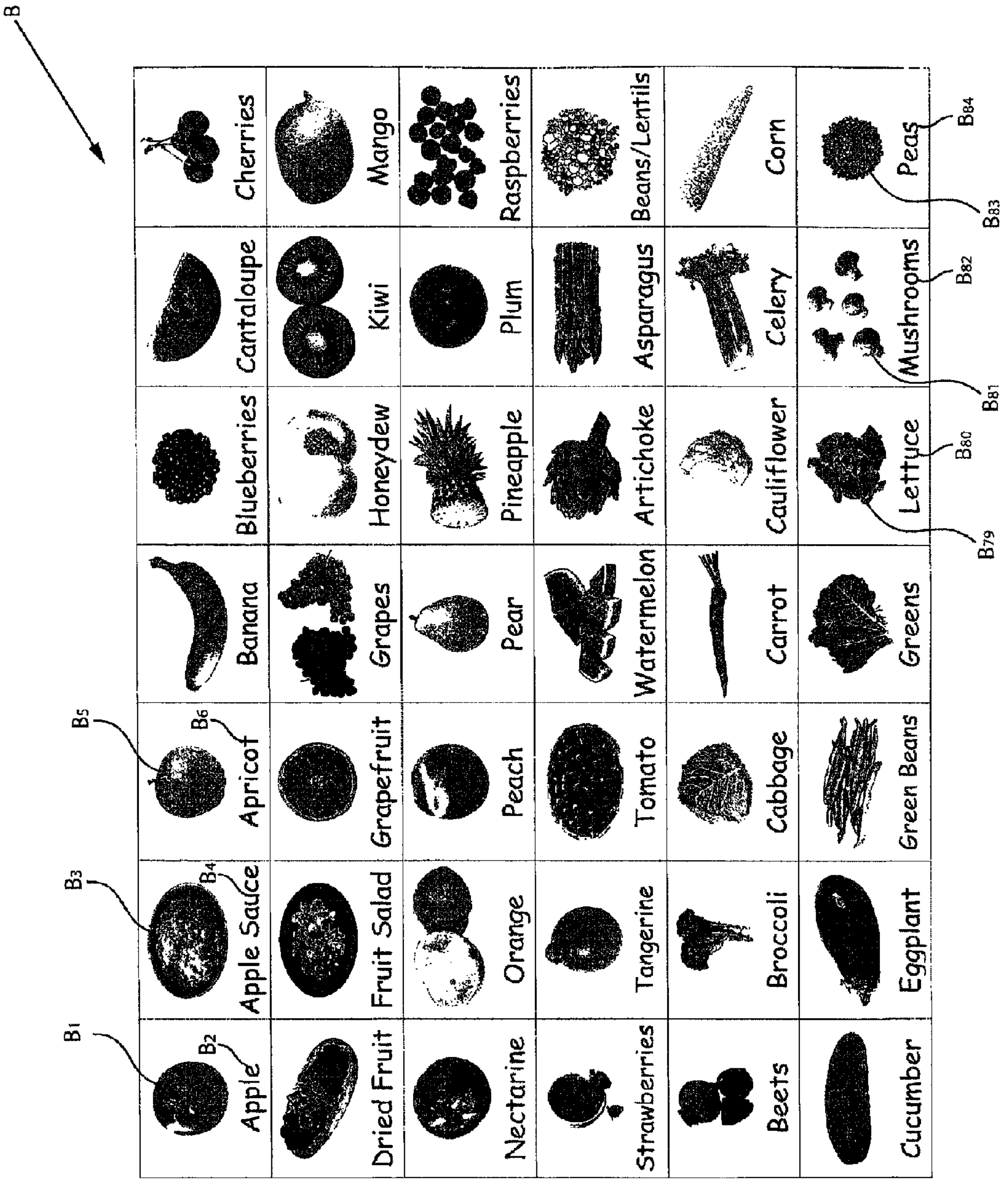
FIG. 3 depicts an embodiment of a bank of graphical images.

With still further reference to the drawings, FIG. 3 depicts an embodiment of a bank B of graphical images $B_1$-$B_{84}$. The graphical images $B_1$-$B_{84}$ may be visual markers pertaining to consumable human nutrients. For example, the odd number referenced graphical images ($B_1$, $B_3$, $B_5$, $B_{n+2}$, . . . , $B_{83}$; where n=the previous integer value reference pertaining to a graphical image in the bank B) may be visual markers of fruit and/or vegetables depicted in picture and/or pictorial format. Moreover, the even number referenced graphical images ($B_2$, $B_4$, $B_6$, $B_{n+2}$, . . . , $B_{83}$; where n=the previous integer value reference pertaining to a graphical image in the bank B) may be visual markers depicting wording corresponding to the visual markers of the fruit and/or vegetable depicted in picture and/or pictorial format. For example, graphical image $B_1$ may be a visual marker depicting a picture and/or pictorial representation of an apple. Furthermore, and accordingly, graphical image $B_2$ may be a visual marker depicting the word "apple" in written format. By way of additional example, graphical image $B_{13}$ may be a visual marker depicting a picture and/or pictorial representation of a cherry or cherries. What is more, ergo, graphical image $B_{14}$ may be a visual marker depicting the word "cherry" or the word "cherries" in written format. Those in the art may recognize that although the bank B of graphical images $B_1$-$B_{84}$ is depicted herein in printed format, the bank may be virtual, in that the entirety of the bank and the associated graphical images $B_1$-$B_{84}$ may be existent in a retrievable storage medium consistent with the utilization of the graphical images $B_1$-$B_{84}$ in relation to a display 20 or 50 (see FIGS. 1-2). Hence, the bank B may be stored via electromagnetic means and also retrieved via associated electromagnetic means. Moreover, the bank B may be stored and retrieved via audible and/or acoustic means. In one example, the bank B may comprise digital information stored on a hard drive retrievably operable with a computer monitor display in the form of display 20 or display 50 and/or other similar display embodiments in accordance with the present invention.

Figure 4:
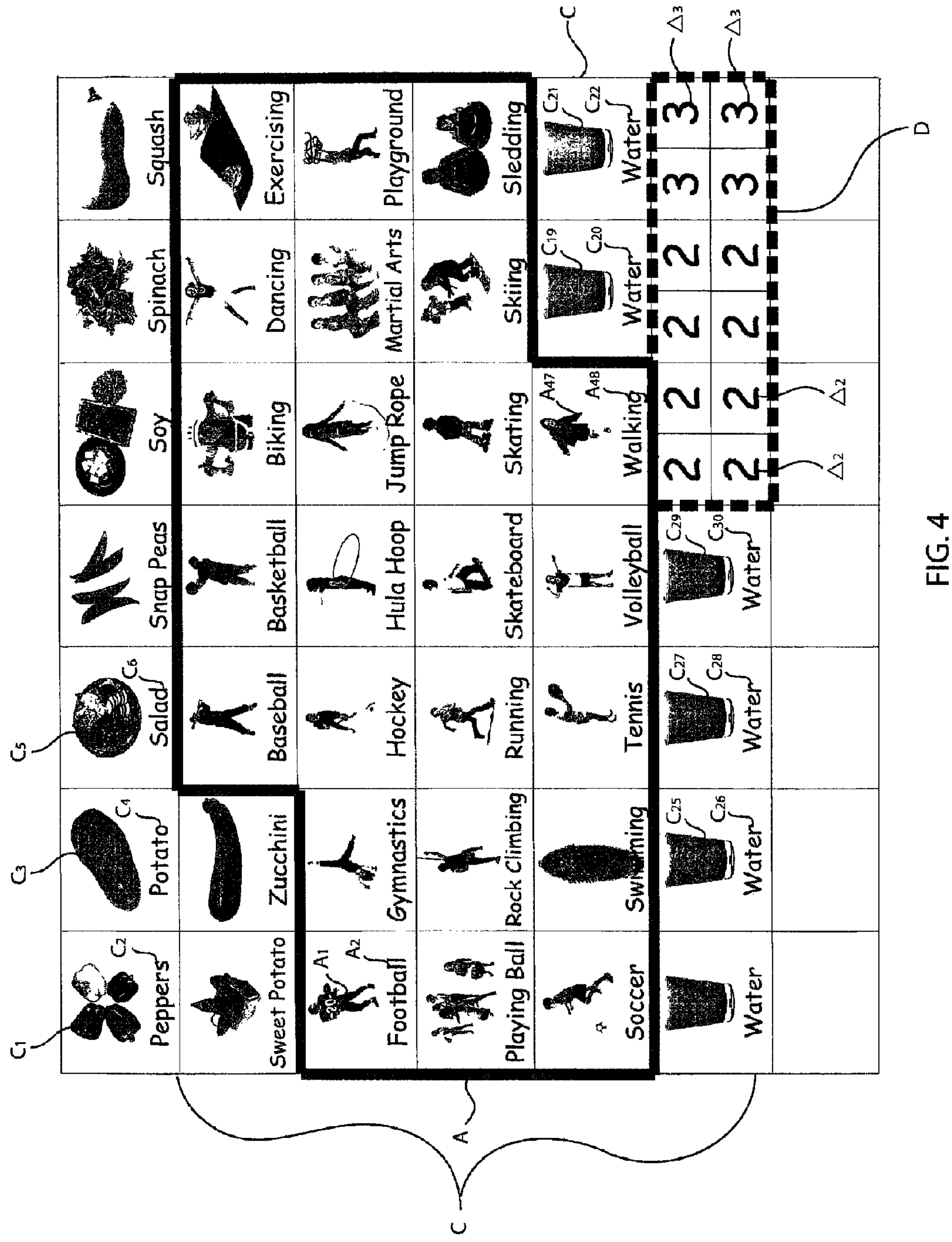
FIG. 4 depicts an embodiment of multiple banks of graphical images, wherein the graphical images of one of the depicted banks pertain to visual markers depicting consumable human nutrients and the graphical images of another of the depicted banks pertain to visual markers depicting human physical activities.

With additional reference to the drawings, FIG. 4 depicts an embodiment of multiple banks A and C of graphical images, wherein the graphical images $A_1$-$A_{48}$ of one of the depicted banks A may pertain to visual markers depicting human physical activities and the graphical images of another of the depicted banks may pertain to visual markers depicting consumable human nutrients $C_1$-$C_{30}$. The graphical images $A_1$-$A_{48}$ of bank A and $C_1$-$C_{30}$ of bank C may be similar to the graphical images $B_1$-$B_{84}$ (see FIG. 3) in that the images may be pictures or pictorial representations and may also comprise corresponding applicable wording. Moreover, the graphical images in bank C or any other bank need not be contiguously grouped in any tangible or virtual medium. For example, as depicted in FIG. 4, all or portions of bank A may be retrievably accessible between portions of bank C. Bank A may be encompassed within a double-lined boundary separating bank A from partially surrounding portions of bank C. Hence, in a general sense, the graphical images attributable to any and/or all banks may be intermingled in any manner that facilitates retrievable accessibility of any and/or all portions of the banks, wherein graphical images may be operably positionable with a display. The banks may also include images pertaining to specific categories. For example, bank A, may comprise graphical images pertaining to virtual markers depicting human physical activities as indicative category 60 and may not comprise graphical images pertaining to virtual markers depicting consumable human nutrients as indicative of category 70 (see FIG. 2). In addition, the graphical images of the various banks may be individually retrievable and/or may be retrieved in groups. In further addition, a bank D may contain graphical images pertaining to visual markers depicting tallying elements $\Delta_2$-$\Delta_n$ such as numbers or other incremental indicators. Thus, the images in bank D may be utilized to account for quantities of other graphical images in other banks that may be removably located on a display and or re-attachably coupled in a distinct categorical region of a display.

With continued reference to FIG. 4 and additional reference to FIGS. 1-3, an embodiment of a graphical image, such as graphical images $A_1$-$A_{48}$, $B_1$-$B_{84}$, $C_1$-$C_{30}$, and/or $\Delta_2$-$\Delta_n$, corresponding respectively to banks A, B, C, and D, may be a printed photograph, a negative, a photocopied image, a inkjet-printed image, a laser-printed image, a color image, a black-and-white image, a sketch, a hand-drawn image, a painting, a computer-generated-and-then-printed image, an image operably displayable on a television monitor, an image operably displayable on a computer monitor, an image operably displayable on an LCD screen, wherein the LCD screen is operable with one and/or multiple electronic devices, an electromagnetically projectable image, a holographic image, an acoustic image, a virtual image, and/or any similar image and the like. For instance, the graphical images may be printed onto material laminated to a magnet or the images may be digitally rendered icons. The graphical images may be removably positioned and/or re-attachably coupled to a display, such as display 20 and/or display 50 and/or any other operable display, in a manner that efficiently retains the images in location on the display until it is desired to remove them. For example, visual marker depicting the graphical images may be attached with Velcro®, buttons, magnets, sticky tape and other sticky substances, general hook and loop fasteners, mounting strips and also designs wherein the display itself has a physical slot or other means that allow the physical markers to be slipped in or fastened and visibly held in place on the display. Moreover, in the case of electromagnetic markers depicting electromagnetic images, the markers may be attached via software, protocol and/or typical hardware capabilities. In addition, the divisions and partitioning into distinct regions of displays may be effected in various manners. For example, categories of consumable nutrients such as fruits and vegetables do not need to be partitioned in and/or located on the same display. Furthermore distinct regions for nutrient such as water, etc. and human physical activities also do not have to be partitioned in and/or positioned on the same display, but various categories having corresponding regions may be placed in any order or location on or with any display as long as visual markers depicting graphical images may be utilized with the applicable categories and incorporated displays.

Figure 5:
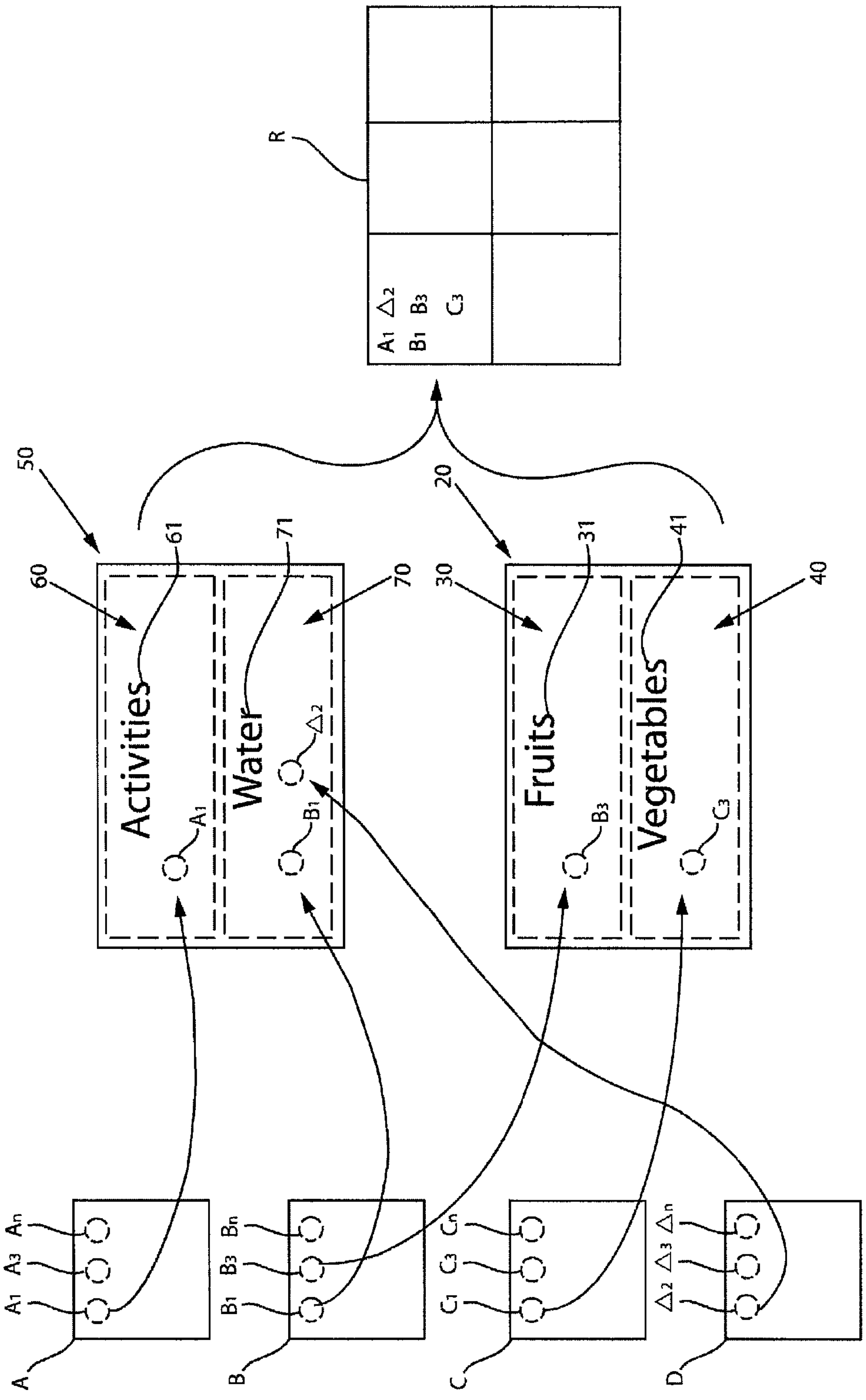
FIG. 5 depicts an embodiment of a nutrient consumption/expenditure planning and tracking system.

Still referring to the drawings, FIG. 5 depicts an embodiment of a nutrient consumption/expenditure planning and tracking system 200. The system 200 may include a bank A, a bank B, a bank C, a bank D, a display 20, a display 50, an a record R. The bank A, may include one graphical image pertaining to a visual marker $A_1$ depicting a human physical activity or multiple images pertaining to visual markers $A_1$-$A_n$ correspondingly depicting human physical activities. The bank B, may include one graphical image pertaining to a visual marker $B_1$ depicting a consumable human nutrient or multiple images pertaining to visual markers $B_1$-$B_n$ correspondingly depicting consumable human nutrients. The bank C, may also include one graphical image pertaining to a visual marker $C_1$ depicting a consumable human nutrient or multiple images pertaining to visual markers $C_1$-$C_n$ correspondingly depicting consumable human nutrients. The bank D, may include one graphical image pertaining to a visual marker $\Delta_2$ depicting a tallying element such as the number 2 or another similar incremental indicators or multiple images pertaining to visual markers $\Delta_2$-$\Delta_n$ correspondingly depicting tallying elements $\Delta_2$-$\Delta_n$ such as additional numbers or other incremental indicators. The display 20 and the display 50 may be laminated paper charts. However, those skilled in the art should appreciate that other embodiments of displays may be incorporated into the system 200 and still accomplish the objectives of the invention.

The system 200 may operate by associating the graphical images with a display or with various displays as the case may be. For example, a graphical image $A_1$ may be removably located in a designated categorical division of the display chart 50, such that the image $A_1$ may be re-attachably coupled in the distinct categorical region 60, wherein the region may include a label 61 "Activities". The positioning of the image $A_1$ may facilitate the planning and/or tracking of nutrient expenditure in that a person performing the activity corresponding with the visual marker relative to image $A_1$ may expend nutrients while performing the depicted activity. For example, if the image $A_1$ pertains to playing ball, then a person may play ball or plan to play ball and expect to expend an amount of nutrients while playing ball. Furthermore, the system may also provide a graphical image $B_1$ to be removably positioned on separate portion of the display chart 50 in the distinct categorical region 70, wherein the region may include a label 71 "Water". The positioning of the image $B_1$ may facilitate the planning and/or tracking of nutrient consumption in that a person consuming the nutrient corresponding with the visual marker relative to image $B_1$ may consume nutrients equivalent with the depicted image. For example, if the image $B_1$ pertains to a cup of water, then a person who accordingly drinks a cup of water or plans to drink a cup of water, may expect to consume an amount of nutrients equivalent to a cup of water. Moreover, the system may provide for the operation of a graphical image $\Delta_2$ with the display 50. A visual marker depicting the graphical image $\Delta_2$ may be positioned on the display 50 to indicate that another image such as image $B_1$ may be represented or tallied according to the incremental value attributable to $\Delta_2$. For example, if a person drinks or plans to drink two cups of water, then a visual marker pertaining to a graphical image depicting a "2" may be indicative of $\Delta_2$. The person may then place the visual marker depicting "2" next to the graphical image $B_1$, possibly depicting the water, to track and/or plan the drinking of two cups of water.

Referring further to FIG. 5, the system 200 may provide for the operation of a graphical image $B_3$ with the display 20. For example, graphical image $B_3$ may be removably positioned on separate portion of the display chart 20 in the distinct categorical region 30, wherein the region may include a label 31 "Fruits". The positioning of the image $B_3$ may facilitate the planning and/or tracking of nutrient consumption in that a person consuming the nutrient corresponding with the visual marker relative to image $B_3$ may consume nutrients equivalent with the depicted image. For example, if the image $B_3$ pertains to a bowl of apple sauce, then a person who accordingly eats a bowl or plans to eat a bowl of apple sauce, may expect to consume an amount of nutrients, such as fruit in the form of applesauce equivalent to a bowl of apple sauce. Similarly, a graphical image $C_3$ may be removably positioned on separate portion of the display chart 20 in the distinct categorical region 40, wherein the region may include a label 41 "Vegetables". Where, the image $C_3$ pertains to a potato, then a person may plan and/or track the nutrients consumed by eating a potato.

Referring further still to FIG. 5, the system 200 may include a record R. The record R may be a recordable medium. For example, it may be a sheet of paper, a notebook, a tape-recorder, a computer, a PDA, an electromagnetic storage device having information retrieval capability, a poster, a calendar, any similar record and the like. The record R may facilitate the recording of nutrient consumption over a specific period of time. For example, if a person utilizes an embodiment of a nutrient consumption/expenditure planning/tracking apparatus comprising a display 20, a display 50 and graphical images drawn from any and or all of banks A-D to plan and/or track nutrient consumption and/or expenditure on a daily basis, then the record R may facilitate the recording of each day's planning and/or tracking for a longer period of time such as a week/month/year/etc. Thus, the system 200 may facilitate the chronicling and/or monitoring of nutrient consumption and/or expenditure over a period time, wherein the nutrient consumption and/or expenditure is in some manner affected by the inventive nutrient consumption and/or expenditure planning and/or tracking apparatus and/or method related thereto.

Figure 6:
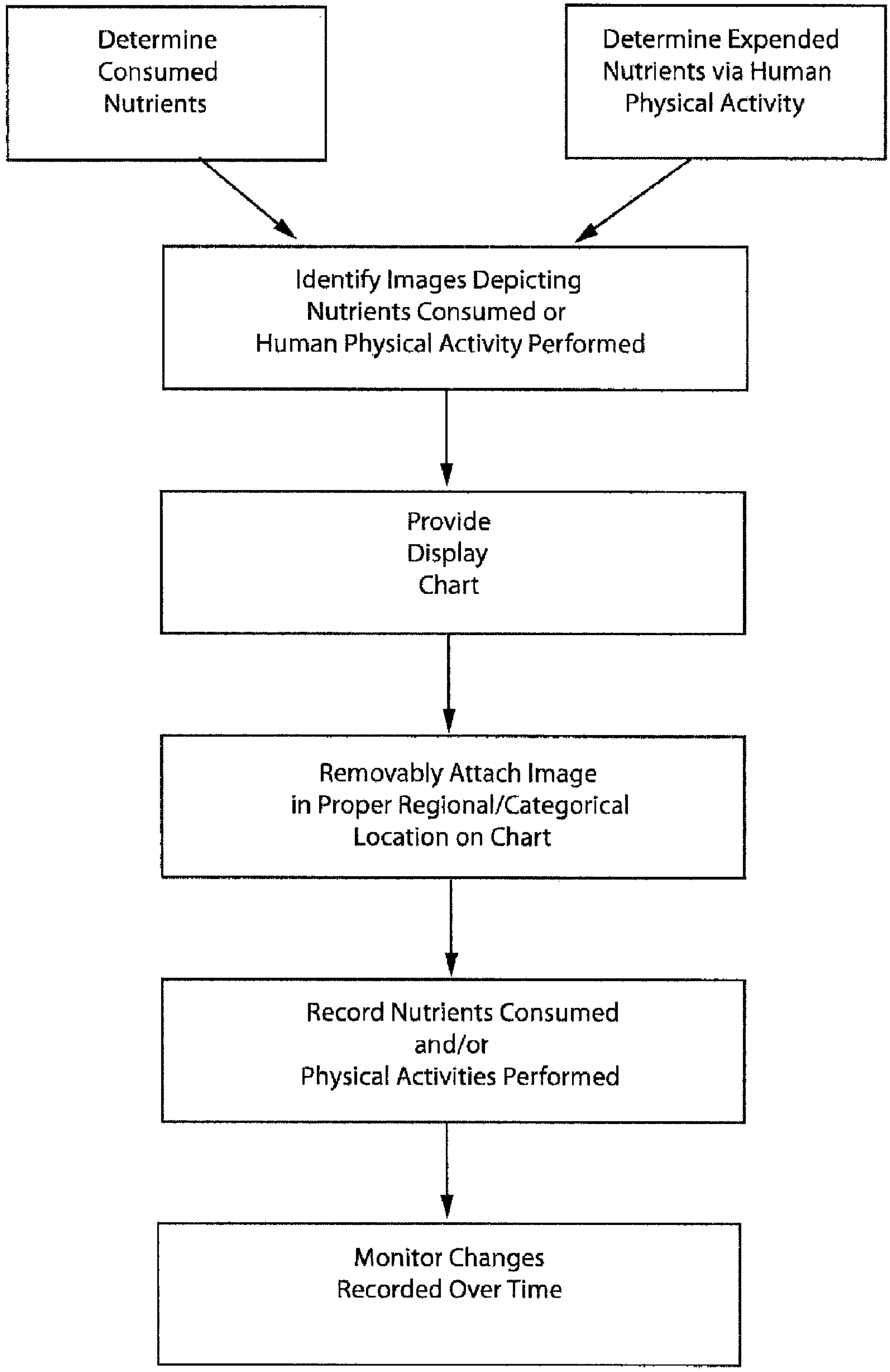
FIG. 6 depicts an embodiment of a method of tracking nutrient consumption and expenditure.

With continued reference to the drawings, FIG. 6 depicts an embodiment of a method of tracking nutrient consumption and expenditure. In accordance with the embodied tracking method a person and/or entity may determine nutrients consumed by a person. Additionally, a person and/or entity may determine nutrients expended by a person via human physical activity. Once determined, a person and or entity may identify visual markers depicting graphical images pertaining to the nutrients consumed and/or human physical activity performed. Furthermore, a method step may include providing a display chart, wherein the chart may include distinct regions corresponding to categories of human nutrients and human physical activity. Where a graphical image or images are identified corresponding to nutrients consumed and/or expended then, in an additional method step, visual markers pertaining to the identified graphical images may be removably attached on the display chart in a proper regional/categorical location positionable on the chart. Over a period of time, an additional step may involve the recording, by a person or entity of nutrients consumed by a person and/or human physical activities expending nutrients by a person. Still further, another method step may include the monitoring of changes in nutrient consumption and/or human physical activity over a period of time. The monitoring period of time may be the same or a different period of time as the time period corresponding to recording of nutrient consumption and/or expenditure.

Referring further still to FIG. 6, the method may be readily adaptable to use by parents and children. For example, a parent or a child may identify nutrients consumed and/or human physical activities performed by the child during a period of a day. The parent or the child may re-attachably position images corresponding to the child's nutrient consumption and expenditure on a display chart. The parent or the child may observe the chart to become more aware of the nutrients consumed during the day and the activities engaged in during the day. The parent or the child may also record the daily consumption and/or expenditure in a weekly/monthly/yearly calendar. As a result, the parent or the child may review the records in the calendar to monitor changes or trends in nutrient consumption and/or expenditure over time. The monitoring may be coupled with the development of graphs, illustrations, tables, statistical analysis and or other developments that may assist monitoring. Thus monitoring may provide information that may be utilized to help plan future nutrient consumption and/or expenditure.

Figure 7:
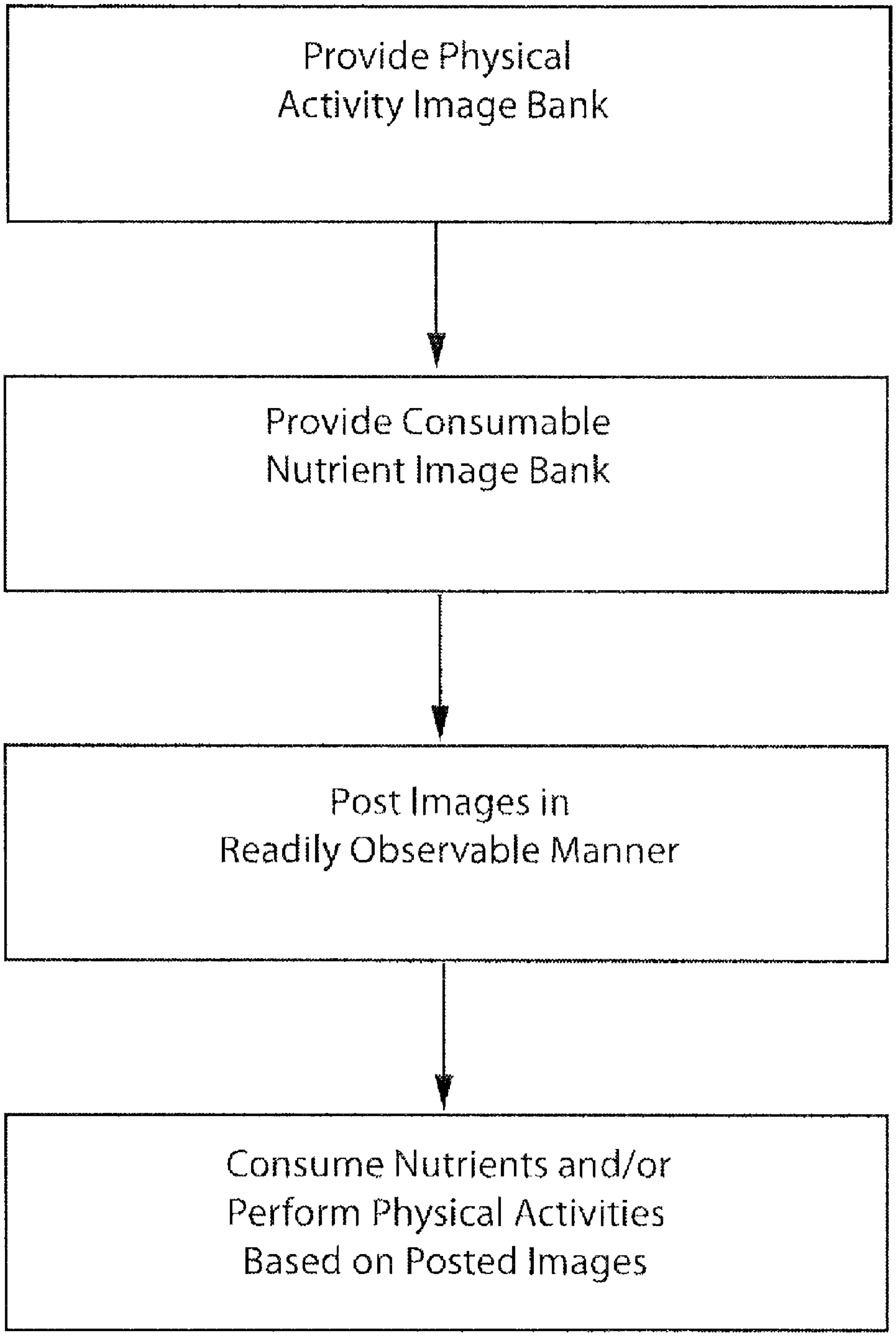
FIG. 7 depicts an embodiment of a method of planning nutrient consumption and expenditure.

With further reference to the drawings, FIG. 7 depicts an embodiment of a method of planning nutrient consumption and/or expenditure. As embodied, the method may include providing a human physical activity graphical image bank. Moreover, the method may also include the provision of a consumable human nutrients graphical image bank. In optional accordance with applicable goals and desires for selection, or (less effectively) based on random selection, an addition method step may include posting selected banked graphical images of consumable human nutrients and human physical activity in a readily observable manner. Then, another step may involve a person consuming nutrients and/or performing physical activities based on the posted images. Hence, the consumption of nutrients and/or expenditure of nutrients due to human physical activity may be coordinated in relation to the posting of banked graphical images pertaining to categories of consumable human nutrients and human physical activities. The embodiment of a method of planning nutrient consumption and/or expenditure may be particularly applicable for use by parent and children While, it is not essential that the selection of graphical images for posting be related to applicable goals and desires, it may be useful, especially in the circumstance when the method is to be, at lease in part, incorporated in the parental guidance of nutrient consumption and/or expenditure of children. Accordingly, parent may employ a procedure for setting goals. The procedure may involve the parent observing a child's current level of consumption of vegetables, fruits, water, and activities. This may be to get a baseline and to be able to set realistic goals. For consistency, a parent may want to do this for at least three days. For accuracy, a parent may want to keep a journal of this data. Once the current consumption level is observed, the parent may want to set a goal. This can be a goal for just vegetables, fruits, water, or activities, a combination of two or more, or all of them. The parent may also optionally set goals for daily rewards or weekly rewards. An example of this might be to eat two vegetables and one fruit for the day. The parent may want to post the goal on or near the display. It is notable that often younger children need more frequent rewards. Hence, with younger children a parent may want to start off rewarding a child's accomplishments daily and increase to weekly. To ensure greater success, a parent may want to be sure to set the goal at the average of observed consumption or one increment higher for the first week. Thus, if the child is currently eating only one fruit per day and nothing else, the parent may not want to make the goal higher than one for increment for vegetables, water or activities, but the goal for fruit could be two. This may increase the likelihood of success in following the planned nutrient consumption and/or expenditure goals.

As pertaining to the types or rewards a parent might choose to reward a child with, it may be beneficial for the parent to read a reward menu having multiple reward choices with the child. Moreover, the parent may want to let the child pick a reward from the menu of choices. Additionally, the chosen reward may also be posted on or near the display. A reward menu may include items such as: books, money, CD's/music, DVD's/movies, extra computer/video-game/ TV/Game-boy time, trip to the playground, game of mini golf, bowling, extra reading time with parent, new outfit, new accessory (hair ribbon, clip, socks, bracelet, etc.), collectable toy, nail polish/manicure, stay up extra ½ hour later, bubble bath, trading cards, magazine, puzzle, trip to the pool, roller-skating/rollerblading, sled ridding, skiing, ice skating, new toothbrush/toothpaste, new craft/hobby supplies, finger paints, trip to the batting cages, new computer game, new video game, trip to see grandparents, visit a relative, play-date/have friend over, deck of cards, trip to the dollar store, Queen/King for the day, and/or a trip to the library.

If the daily/weekly goal is achieved by a child, a parent may reward the child with the child's chosen reward. After the first week, a parent may want to raise the nutrient consumption/expenditure goal, depending on how the child has responded. However, a parent may need to be careful not to raise the goal by too much. To help the child to be successful, a gradual raise may lessen the chance of frustration if the child is unable to attain the goal. This decision (goal amount), can be made by the parent or together with the child.

In accordance with the nutrient consumption and/or expenditure planning and/or tracking apparatus, system and/or method, the setting of goals may be optional. A parent or a person utilizing the invention may not need to set goals for a child or any other person utilizing the invention to be successful and increase his/her consumption for vegetables, fruits, water, or activities. However, setting goals may motivate a child or another person and make this utilization of the invention more fun. Parents know their children best. Therefore if parents chose to set goals and their children becomes frustrated, the parents may either eliminate the goals or lower the amount until the children feel more comfortable.

Furthermore, embodiments of a nutrient consumption and/or expenditure planning and/or tracking apparatus, system and/or method may be operably implemented and executed with multiple human participants. Accordingly embodiments of the present invention may be utilized to plan and/or track consumption and/or expenditure of nutrients by one or a plurality of humans. For example, a group instructor/leader/teacher may utilize a nutrient consumption/expenditure planning and tracking apparatus, such as apparatus 10 including an embodiment of a display 50. The teacher may have a few students come to the front of a classroom and indicate which physical activities they participated in during the last 24 hours or during the last week by moving corresponding graphical images, such as graphical images $A_1$-$A_{48}$ and/or $C_{19}$-$C_{30}$ relating to Meal and Motion Markers, and manipulate the images to the corresponding physical regions 52/54 of the display 50 of apparatus 10. Such utilization of the apparatus may help track and/or plan the students' nutrient consumption/expenditure and may reinforce goals such as an hour per day of physical activity. Similarly, an instructor may have a few students come to the front of the classroom and indicate how many servings of water, milk, or other liquid nutrients they have consumed in the past 24 hours, moving the corresponding Meal and Motion Markers magnetic manipulatives, such as images from banks A-D, to the display chart. Accordingly, use of the apparatus, such as apparatus 10, may reinforce the concept of drinking 2-4 servings of milk per day and 5-10 servings of water every day and may serve as a reminder to the students that it is unwise to drink empty calories.

Additionally, embodiments of a nutrient consumption and/or expenditure planning and/or tracking apparatus, system and/or method may facilitate education of children/students about healthy nutrient consumption/expenditure. For instance a teacher may utilize a magnetic whiteboard display for visual learning/planning/tracking. The students may be instructed to make a list of the 5-9 servings of fruit and vegetables they plan to eat tomorrow. Moreover the lists of the various students may be compared. Then, a few students may come to the whiteboard and move the fruit and vegetable magnets, such as images $B_1$-$B_{84}$ representing their food choices to the Healthy Choices planning tracking apparatus 10. The magnetic images, such as images $B_1$-$B_{84}$, may be stored in a bank, such as bank B, which may comprise a bin, a folder, a drawer, or any other storage entity that may house the magnetic images.

Still further children/students may using the Meal Markers magnetic manipulatives, to review the fruits and/or vegetables available at fast food restaurants. The children may choose images corresponding to such available fruits and vegetables and position the images on a display. This type of activity may remind students that it is important to always make healthy food choices, even when they are eating at fast food restaurants. Those in the art should recognize that images corresponding to banks may be pre-existing and brought into the bank for storage and use. For example, children/students may cut out pictures of foods/drinks/physical activities from magazines and ads and make collage banks of the pictures, placing each picture image in the correct bank category, such as banks A-D. The banks may be used to help the children plan to achieve a goal of FIVE-A-DAY in relation to Fruits and Vegetables. As such, students/children may consult the Meal Markers Healthy Choices chart and evaluate images in the banks to remind the students/children to eat a variety of different fruits and vegetables every day. In addition, students may learn and plan nutrient consumption by actually viewing, and possibly consuming, real fruits and vegetables and the identify each of the consumed fruits/vegetables with the Meal Markers magnets, from banks A-D. Have students sort the vegetables on their plate by color, by how they grow, or by how much they like them, and eat the vegetables. Moreover, students may be divided into three groups, wherein one group may be assigned to breakfast, one to lunch, and the last group to dinner. The students may accordingly plan healthy meals, remembering to use fruits, vegetables, and healthy beverage choices that may be consumed at a typical meal.

Group or individual data, obtained through at least partial operation and/or execution of embodiments of a nutrient consumption and/or expenditure planning and/or tracking apparatus, system and/or method may facilitate listing or graphing of nutrients, activities, and/or other chartable elements that may assist in educating participants about planning and/or tracking of nutrient consumption/expenditure. For instance, parent or teacher may use the planning/tracking apparatus, such as apparatus 10, to determine whether a child or children have ever tried each of the fruit and vegetables the Meal Markers chart of banked images. The number of students who have tried each fruit and vegetable may then be tallied as the markers are positioned on the display. A list of the fruits and vegetables that no one has tried may be generated thereby and placed on a record, such as record R. Moreover, a frequency graph of the fruits and vegetables students have eaten may be generated to reveal which nutrients are consumed most often. Such activities may encourage students to willingly try unfamiliar fruits and vegetables or other nutrients possibly marked in an image bank, such as banks A-D. Likewise, visual markers $\Delta_2$-$\Delta_n$, may be utilized, with embodiments of the present invention to record the total number of fruit and/or vegetable servings as well as the numbers of students who had 1 serving, 2 servings, 3 servings, etc.

Motion markers, such as markers $A_1$-$A_{48}$, may be used with embodiments of the present invention to help children/students track the number of minutes of physical activity they have had in the last 24 hours, wherein serving markers may be allotted or designated with apportioned unites of time. For example, $\Delta_2$ may be designated as 5 minutes, while $\Delta_4$ may be designated as 15 minutes, etc. Accordingly, the markers $A_1$-$A_{48}$ and $\Delta_2$-$\Delta_n$. may be utilized to tally up the total number of minutes pertaining to nutrient expenditure of the entire class. Also the average number of minutes of physical activity per student may be tallied. Such tracking may remind students that they need to be engaged in an hour of physical activity each and every day. Furthermore, the students may be asked students to write down on small pieces of paper the number of minutes spent watching television or playing video games and the gathered information may be compare and contrast with the results about physical activity garnered by embodiments of a nutrient consumption and/or expenditure planning and/or tracking apparatus, system and/or method. Accordingly, the class average of both time spent with electronic entertainment versus the time spent in physical nutrient expenditure may be made available. The availability of such information may reinforce with the students the medical recommendation of an hour a day of physical activity.

Even further still, embodiments of a nutrient consumption and/or expenditure planning and/or tracking apparatus, system and/or method, may allow students to plan/track nutrient consumption/expenditure over various periods of time. For instant, a parent or teach may ask ac child if they have tried a new fruit or vegetable in the last week or month. The child or children may then locate the fruit or vegetable on the Healthy Choices Chart by maneuvering a banked marker to a display. The same process could be repeated for liquid nutrients, such as water. Moreover, the child(ren) may be asked what physical activities they have engaged in the last week/month. In addition, daily weekly charting can be recorded, on a record such as record R, for time-based tracking and/or planning. Furthermore, preferences for consumption/expenditure may be tracked. As such, a frequency graph of the students' consumption/expenditure of nutrients over time may be generated. Such a graph may be utilized to show how healthy choices can affect behavior, and may reinforce healthy planning.

The use of embodiments of a nutrient consumption and/or expenditure planning and/or tracking apparatus, system and/or method may be incorporated into games. For instance, by way of non-limiting example, an instructor may toss a bean bag to students around the room. As they catch the bean bag have them say the name of a fruit or vegetable that they have eaten or plan to eat and then place the corresponding marker on a display, such as display 20/50. A fun aim may be to see if the instructor can go around the entire classroom without the students repeating any of the fruits or vegetables. Moreover, a similar game may be implemented in relation to the tracking/planning of physical activities that have been or will be performed by students. Those in the art should recognize that myriads of games and approaches may be utilized to encourage students to use embodiments of a nutrient consumption and/or expenditure planning and/or tracking apparatus, system and/or method to productively and efficiently track and/or plan nutrient consumption and/or expenditure. Furthermore, those of ordinary skill should appreciate that a parent may comprise a teacher/leader/instructor.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims:

I claim:

1. A nutrient consumption/expenditure tracking method comprising:

providing a chart, wherein the chart includes:

distinct regions corresponding to a category of human nutrients and human physical activity; and, a first bank of visual markers, wherein the first bank of visual markers includes a plurality of visual markers, each of the plurality of visual markers pertaining to a different individual consumable nutrient belonging in the category of human nutrients and a second bank of visual markers, wherein the second bank of visual markers includes a plurality of visual markers, each of the plurality of visual markers pertaining to a different human physical activity, wherein each of the visual markers is removably attachable to the chart;

removably attaching a first visual marker from the first bank of visual markers to the distinct region of the chart corresponding to the category of human nutrients when a person actually consumes the human nutrient representatively depicted in the first visual marker;

removably attaching a second visual marker from the second bank of visual markers to the distinct region of the chart corresponding to human physical activity when a person actually performs the human physical activity representatively depicted in the second visual marker;

monitoring the placement of visual markers in distinct regions of the chart to determine what types and what amounts of human nutrients were consumed by a person during a period of time in which actual nutrient consumption is tracked via representative visual markers; and, monitoring the placement of visual markers in distinct regions of the chart to determine what types and what amounts of human physical activity were performed by a person during a period of time in which actual physical activity is tracked via representative visual markers.

2. The nutrient consumption/expenditure tracking method of claim 1, wherein said method is operably implemented and executed with multiple human participants.

3. The nutrient consumption/expenditure tracking method of claim 2, wherein data obtained through at least partial execution of said method facilitates listing or graphing of nutrients and activities that is utilized to assist in educating participants about planning for nutrient consumption and expenditure.

4. A method of planning nutrient consumption and expenditure comprising:

providing a first bank of visual markings, each having graphical images categorically depicting a plurality of different human physical activities;

providing a second bank of visual markings, each having graphical images categorically depicting a plurality of different consumable human nutrients;

providing a chart having distinct regions corresponding to human physical activity and consumable human nutrients;

posting a visual marking from the first bank in a readily observable manner on the chart in the region corresponding to physical activity, wherein the posting of the visual marking from the first bank corresponds to projected completion of a particular physical activity, that is depicted by the visual marking from the first bank, to be performed by a person during a set period of time;

posting a visual marking from the second bank in a readily observable manner on the chart in the region corresponding to consumable human nutrients, wherein the posting of the visual marking from the second bank corresponds to projected consumption of a particular human nutrient, that is depicted by the visual marking from the second bank, by a person during the set period of time; and, utilizing the visual markings posted from the first bank and second bank to dictate the performance of human physical activity and the consumption of human nutrients by a person during the set period of time.

5. The method of planning nutrient consumption and expenditure of claim 4, wherein said method is operably implemented and executed with multiple human participants.

6. The method of planning nutrient consumption and expenditure of claim 5, wherein said method is executed by said multiple human participants.

7. The method of planning nutrient consumption and expenditure of claim 5, wherein said method is executed by a single instructor.

* * * * *